United States Patent
Abe et al.

(10) Patent No.: US 7,156,071 B2
(45) Date of Patent: Jan. 2, 2007

(54) INTAKE DEVICE FOR INTERNAL COMBUSTION ENGINE

(75) Inventors: Kazuyoshi Abe, Susono (JP); Akio Yoshimatsu, Susono (JP); Shinya Wakabayashi, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/391,481

(22) Filed: Mar. 29, 2006

(65) Prior Publication Data
US 2006/0219202 A1    Oct. 5, 2006

(30) Foreign Application Priority Data
Apr. 1, 2005    (JP) .............. 2005-106248

(51) Int. Cl.
*F02B 31/06*    (2006.01)
(52) U.S. Cl. .................. 123/306; 123/188.14
(58) Field of Classification Search ........... 123/188.14, 123/306, 308
See application file for complete search history.

(56) References Cited

U.S. PATENT DOCUMENTS

| | | | |
|---|---|---|---|
| 4,320,725 A * | 3/1982 | Rychlik et al. ........ | 123/188.14 |
| 6,634,333 B1 * | 10/2003 | Fujieda et al. .............. | 123/308 |
| 6,705,280 B1 * | 3/2004 | Lippert ........................ | 123/306 |
| 6,874,465 B1 * | 4/2005 | Arimatsu et al. ........... | 123/306 |
| 2004/0226535 A1 * | 11/2004 | Sakai ........................ | 123/308 |

FOREIGN PATENT DOCUMENTS

| | | |
|---|---|---|
| JP | 07-025264 | 5/1995 |
| JP | 07-174028 | 7/1995 |
| JP | 11-107764 | 4/1999 |
| JP | 13170 | 3/2002 |
| JP | 2002-309946 | 10/2002 |
| JP | 2004-068687 | 3/2004 |
| JP | 2004-124836 | 4/2004 |

* cited by examiner

Primary Examiner—T. M. Argenbright
(74) Attorney, Agent, or Firm—Kenyon & Kenyon LLP

(57) ABSTRACT

An intake device includes an intake pipe, a valve having a downstream side including a cutoff portion and an upstream side rotatably attached to an inner wall of the intake pipe, and a partition plate provided in the intake pipe so as to divide an intake passage in the intake pipe into an upper intake passage and a lower intake passage. The valve has an open state in which the upper and lower intake passages are open, a closed state in which the upper and lower intake passages are closed; and an intermediate state in which the lower intake passage is closed.

13 Claims, 16 Drawing Sheets

17:ACTUATOR

17:ACTUATOR

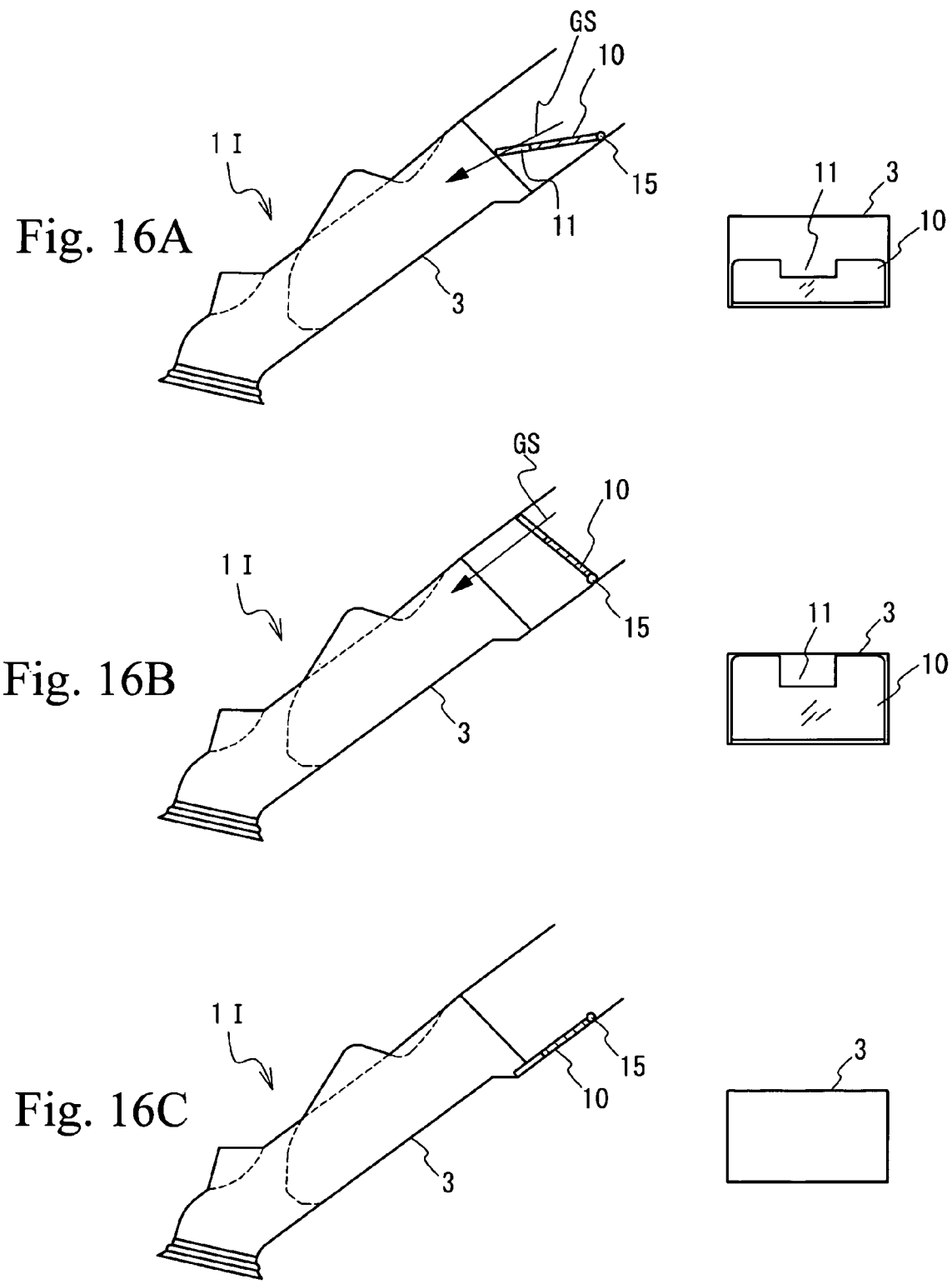

INTAKE DEVICE FOR INTERNAL COMBUSTION ENGINE

BACKGROUND OF THE INVENTION

1. Field of the Invention

The present invention relates to intake devices for internal combustion engines, and more particularly, an intake device that controls an intake flow passing through an intake pipe to thus improve the combustion efficiency of the internal combustion engine.

2. Description of the Related Art

There are various proposals of an intake device that controls an intake flow by an open/close valve arranged in an intake pipe (also called intake port) through which the intake air is supplied to the cylinder side of the internal combustion engine. For example, Japanese Patent Application Publication No. 2004-124836 discloses the use of a partition plate (wall) arranged in an intake passage along a longitudinal direction thereof so that the intake passage is divided into first and second passages respectively located on the upper and lower sides of the partition plate. Further, two plate-shaped valve plates that rotate about a supporting shaft are arranged on the upstream side of the partition plate, and are capable of opening and closing a part of the intake passage. It is thus possible to adjust the opening ratio of the intake passage and reinforce a tumble flow, so that stable combustion of a lean air-fuel mixture can be achieved.

However, the use of the two valves rotating about the single shaft results in a complex mechanical structure. Further, one of the two valves arranged to the first passage for forming the tumble flow is comparatively small, and has a difficulty in forming a desired strong tumble flow.

SUMMARY OF THE INVENTION

The present invention has been made in view of the above circumstances and has an object to provide an intake device for an internal combustion engine that has a simple structure and a capability of controlling the tumble flow in a wide range.

According to an aspect of the present invention, there is provided and intake device including: an intake pipe; a valve having a downstream side including a cutoff portion and an upstream side rotatably attached to an inner wall of the intake pipe; and a partition plate provided in the intake pipe so as to divide an intake passage in the intake pipe into an upper intake passage and a lower intake passage, the valve having an open state in which the upper and lower intake passages are open, a closed state in which the upper and lower intake passages are closed; and an intermediate state in which the lower intake passage is closed.

The intake device may be configured so that the valve has a downstream end portion that includes the cutoff portion and is aligned with the partition plate in the intermediate state.

The intake device may be configured so that the valve includes a plate-shaped member having a curved upper surface that guides an intake flow to the upper intake passage in the intermediate state.

The intake device may be configured so that the valve includes a downstream bent portion that is bent from a flat base portion and includes the cutoff portion, the downstream bent portion being aligned with the partition plate in the intermediate state.

The intake device as claimed in claim 1 may be configured so that the partition plate has a protrusion that is fitted into the cutoff portion in the intermediate state.

The intake device may be configured so that the valve includes a downstream end portion that includes the cutoff portion and guides an intake flow upwards in the intermediate portion.

The intake device may be configured so that the downstream side of the valve is thicker than the upstream side thereof so as to guide an intake flow to the upper intake passage in the intermediate state.

The intake device may be configured so that the cutoff portion is positioned on an upper intake passage side in the intermediate state.

The intake device may be configured so that the partition plate has a groove that receives an intake flow passing through the cutoff portion in the intermediate state.

The intake device may further include an elastic member attached to an upstream side of the partition plate, wherein the valve contacts the elastic member in the intermediate state.

The intake device may be configured so that the intake pipe has a convex portion that forms a passage together with the cutoff portion in the closed state.

The intake device may be configured so that the valve has a downstream end portion that forms a continuous flat surface together with an upper surface of the valve in the intermediate state.

The intake device may be configured so that the cutoff portion has an attitude in the intermediate state in which the cutoff portion is substantially parallel to an intake flow.

BRIEF DESCRIPTION OF THE DRAWINGS

Preferred embodiments of the present invention will be described in detail based on the following figures, wherein:

FIGS. 16A, 16B and 16C show an intake device in accordance with a ninth embodiment of the present invention.

DESCRIPTION OF THE PREFERRED EMBODIMENTS

In order to facilitate better understanding the present invention, a description will now be given of background art related to the present invention.

Figure 1:
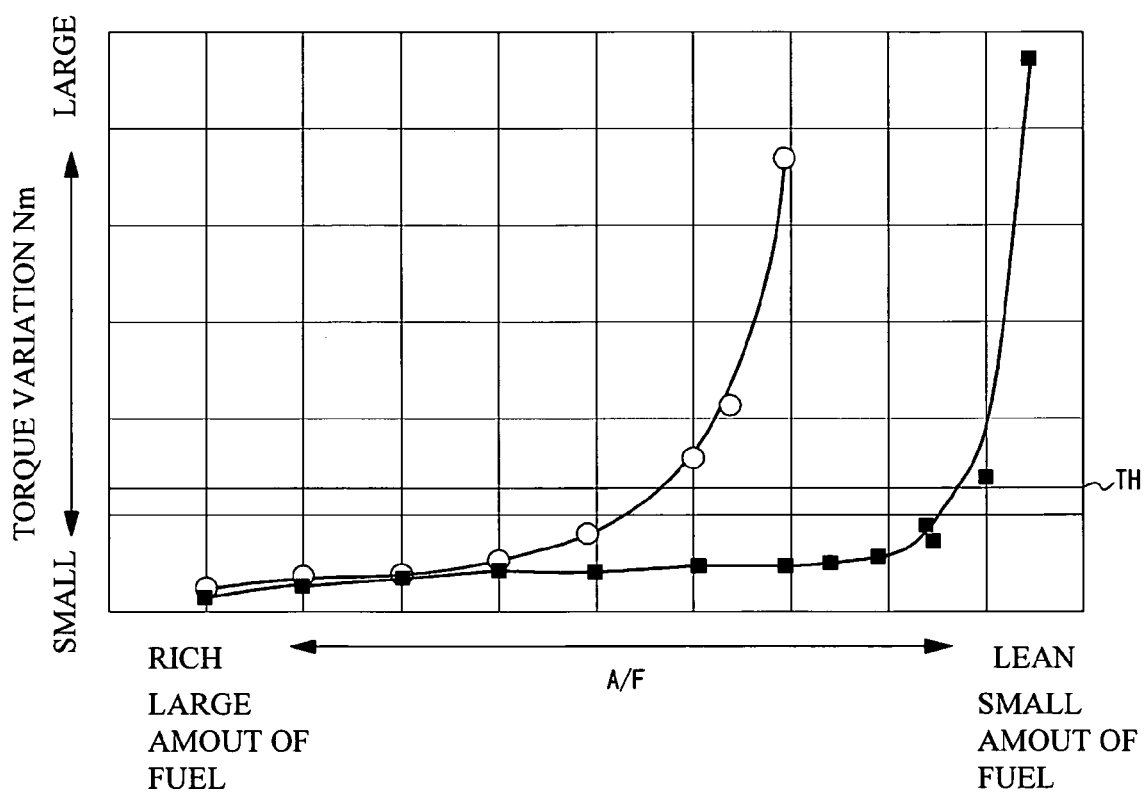
FIG. 1 is a graph showing a relationship between a torque variation and an air-fuel ratio of an air-fuel mixture supplied to an internal combustion engine.

FIG. 1 is a graph of a torque variation vs. air-fuel ratio (A/F) of an air-fuel mixture supplied to an internal combustion engine. In order to improve the combustion efficiency, it is important to smoothly operate the internal combustion engine at even a reduced fuel ratio in the air-fuel mixture. However, as shown in FIG. 1, when the A/F ratio reduces to the lean side, a great variation in torque abruptly takes place at a certain A/F ratio, and exceeds a threshold level TH for torque variation. The internal combustion engine having a torque variation beyond the threshold level TH is not suitable for practical use. While circles in the graph indicate torque variations observed when a general intake device. In contrast, black squares indicate torque variations observed when an intake device of the present invention is employed. According to the present invention, a great torque variation takes place at a leaner point of the A/F ratio, and the combustion efficiency of the engine can be improved. Exemplary intake devices of the present invention capable of improving the combustion efficiency will now be described.

(First Embodiment)

Figure 2A:
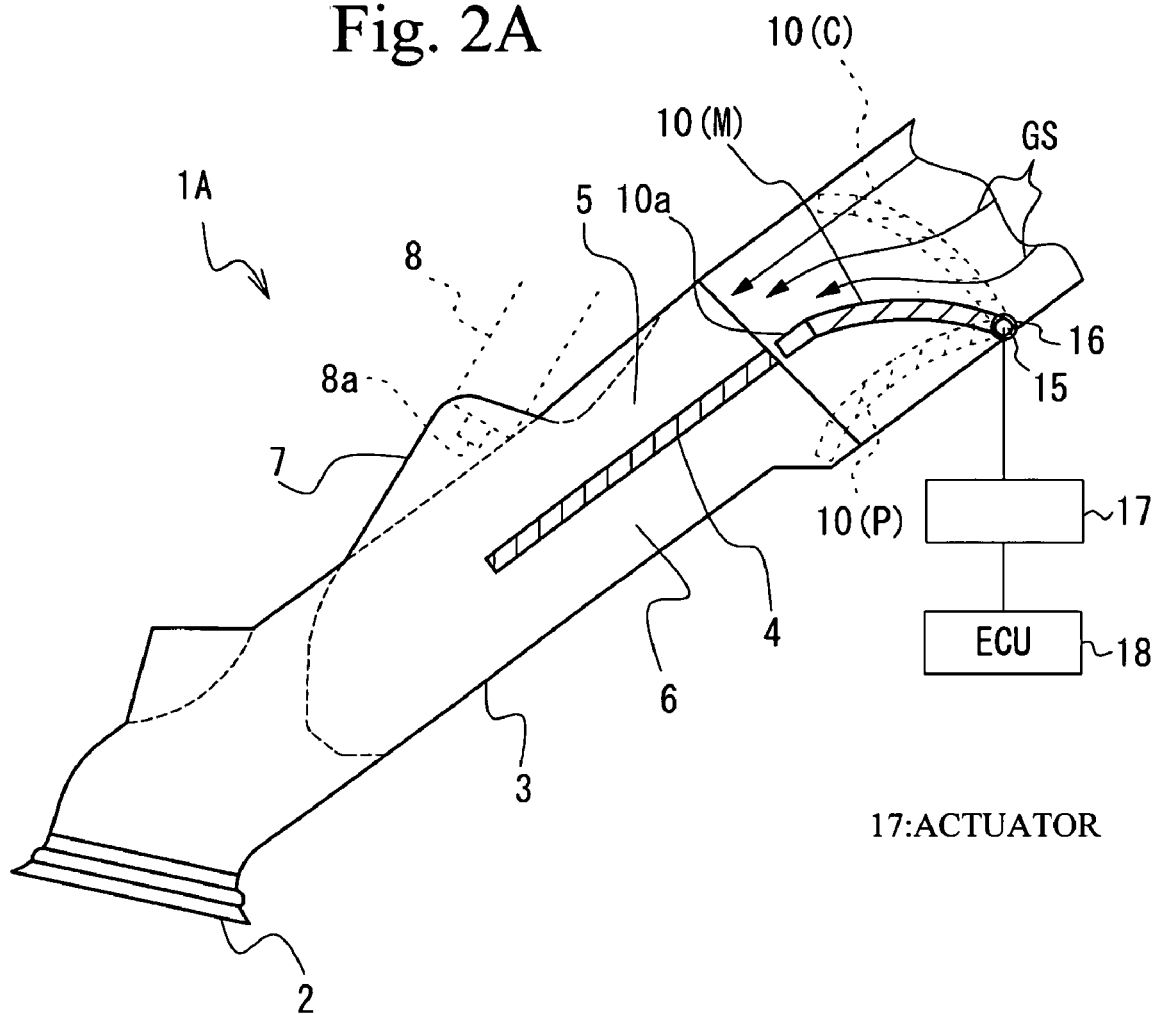
FIGS. 2A and 2B show an intake device in accordance with a first embodiment of the present invention.
Figure 2B:
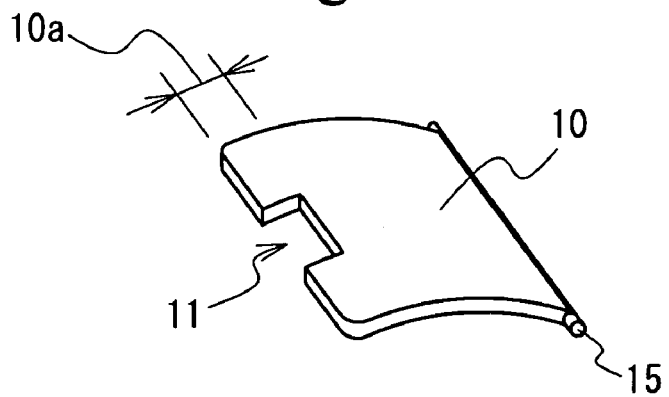

FIGS. 2A and 2B show an intake device 1A for an internal combustion engine in accordance with a first embodiment of the present invention. The intake device 1A is arranged in a connection between a cylinder side of the internal combustion engine and an intake manifold thereof. The intake device 1A has an end at the cylinder side, and another end at the intake manifold side (not show for the sake of simplicity). An intake flow GS goes from the intake manifold side to the cylinder side. In many cases, an intake passage or pipe of the intake device is provided within a cylinder head of the internal combustion engine. The present invention is not limited to the above arrangement but includes another arrangement of the intake pipe. The intake pipe may be a part of the intake manifold or a pipe separate from the intake manifold. The following description does not specifically limit the position of the intake pipe.

FIG. 2A shows a structure of the intake device 1A, and FIG. 2B is a perspective view of an open/close valve arranged in the intake device 1A. A partition plate 4 is arranged within an intake pipe 3 along the longitudinal direction thereof. The partition plate 4 divides the passage of the intake pipe 3 into a first (upper) intake passage 5 and a second (lower) intake passage 6. An injector attachment port 7 is formed on an upper portion of the first intake passage 5 so as to protrude therefrom upwards. An injector 8 is inserted into the attachment port 7. Fuel is injected into the intake pipe 3 from a tip end 8a of the injector 8.

An open/close valve 10 is arranged at the upstream side (intake manifold side) of the partition plate 4. The valve 10 is equipped with a support shaft 15 located at an end on the upstream side. A bearing unit 16 arranged to the inner wall of the intake pipe 3 supports the support shaft 15. The valve 10 is rotatable about the support shaft 15. In FIG. 2A, the bearing unit 16 is arranged on the inner wall closer to the second intake passage 6 than the first intake passage 5. A turning force from an actuator 17 is applied to the support shaft 15. The actuator 17 is controlled by an ECU (Electronic Control Unit) 18. The ECU 18 may be separate from another ECU for controlling the internal combustion engine or may be incorporated therein. The valve 10 may be driven to a desired position under the control of the actuator 17 on the basis of the engine condition.

When the valve 10 lies along the inner wall of the intake pipe 3 as indicated by 10(P), the valve 10 is in the fully open state in which the maximum opening ratio is available. In contrast, when the valve 10 stands in the intake pipe 3 as indicated by 10(C), the minimum opening ratio is available. The valve 10 can be rotated between the position P that forms the closed state and the position C that forms the fully open state.

There is a specific position at which an end 10a of the valve 10 becomes very close to the partition plate 4 on the way from the closed state to the fully open state or vise versa. In the following, the specific position is called half-open position. The valve 10 located at the half-open position is in the half-open state that is an intermediate state between the fully open state and the closed state. The valve 10 at the half-open position is indicated by 10(M).

The valve 10 is formed so that, when the valve 10 comes into the half-open position M, the downstream end portion 10a is substantially aligned with the partition plate 4. As shown in FIG. 2B, the downstream end portion 10a has a cutoff portion 11 that is formed on the downstream side thereof and is located in the center in the width direction (direction perpendicular to the drawing sheet in FIG. 2A). The support shaft 15 is provided on the fixed-end side (upstream side) of the valve 10 and is supported by the bearing unit 16 provided on the inner wall of the intake pipe 3. Thus, the valve 10 can be rotated about the shaft 15 in a cantilever state. As described above, the valve 10 has the downstream side including the cutoff portion 11 and the upstream side rotatably supported by the support shaft 15.

As described above, the downstream end portion 10a having the cutoff portion 11 becomes substantially aligned with the partition plate 4 when the valve 10 comes into the half-open position. At the half-open position, the upper surface of the partition plate 4 and the upper surface of the valve 10 make a continuous surface. The downstream end portion 10a may form a flat surface together with the partition plate 4 in the half-open state. The advantages of the valve 10 thus formed will now be described with reference to FIGS. 3A through 6, in which parts that are similar to those of the valve 10 are given the same reference numerals.

Figure 3A:
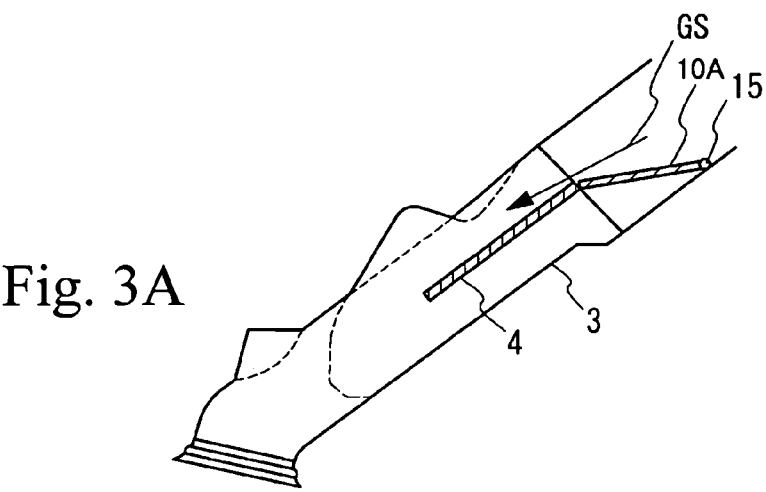
FIGS. 3A, 3B and 3C show a comparative intake device having no cutoff portion in a valve.
Figure 3A:
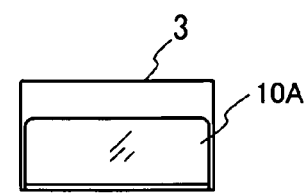
Figure 3B:
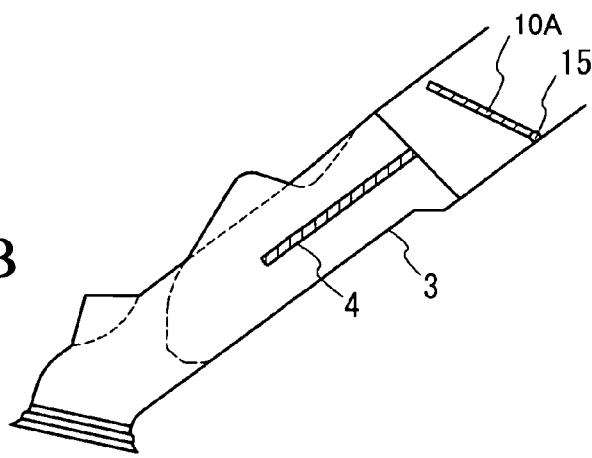
Figure 3B:
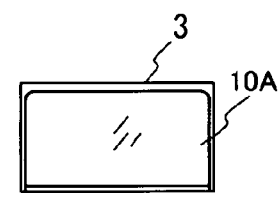
Figure 3C:
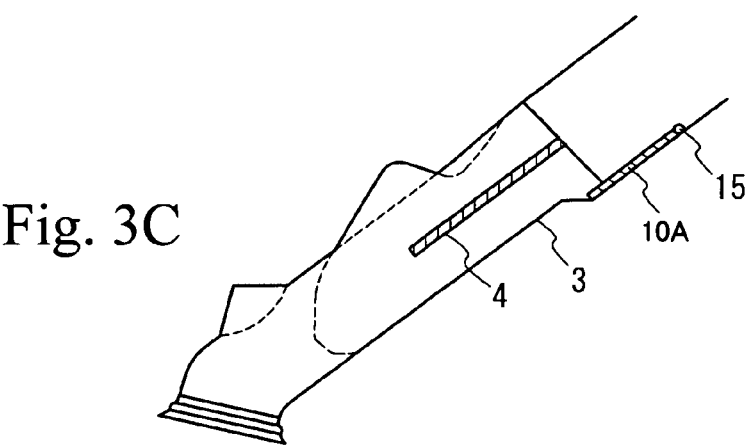
Figure 3C:
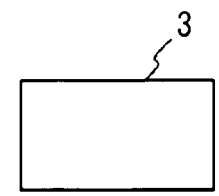
Figure 4A:
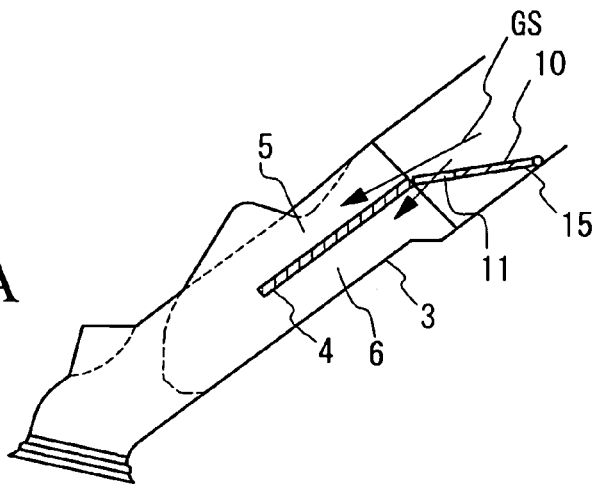
FIGS. 4A, 4B and 4C show an intake device having a cutoff portion on the downstream side of the open/close valve.
Figure 4A:
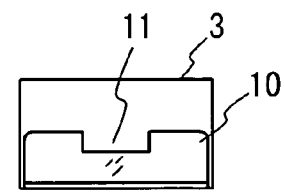
Figure 4B:
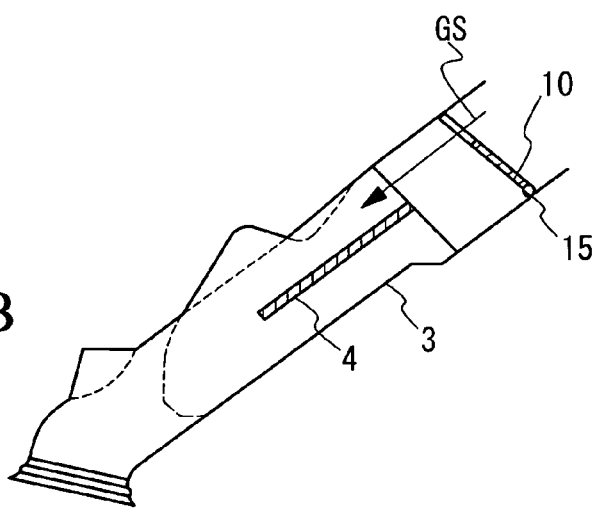
Figure 4B:
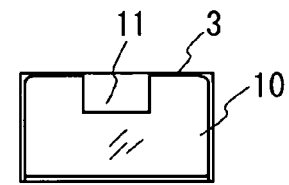
Figure 4C:
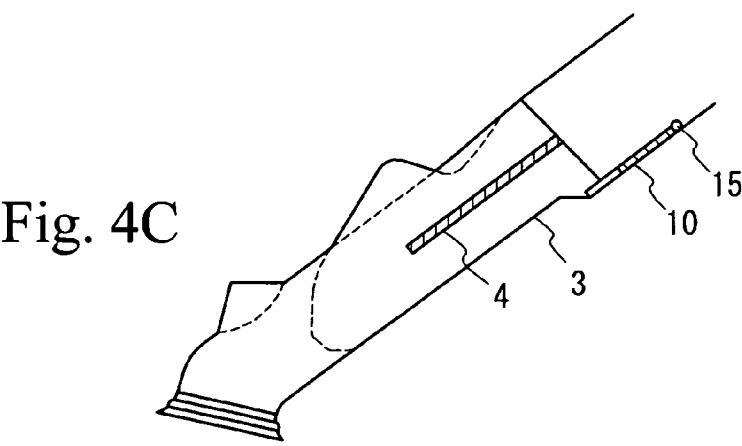
Figure 4C:
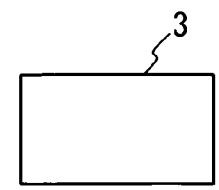

FIGS. 3A, 3B and 3C show a comparative intake device 10A having no cutoff portion on the downstream side thereof. FIG. 3A shows the half-open state of the valve 10A, and FIG. 3B shows the closed state. FIG. 3C shows the fully open state of the valve 10A. Figures on the right-hand sides of FIGS. 3A through 3C show the valves 10A viewed in the direction of an intake flow GS. FIGS. 4A through 4C show states of the valve 10 having the cutoff portion 11 in accordance with the first embodiment.

The intake devices shown in FIGS. 3A through 3C and 4A through 4C are superior to the conventional intake device because the valves 10 and 10A are rotated about the support shaft 15 arranged on the inner wall of the intake pipe 3 and are thus simple structurally. Further, the intake devices are capable of controlling the magnitude of the tumble flow in the wide range by rotating the valves 10 and 10A between the closed state and the fully open state.

The valve 10 shown in FIGS. 3A through 3C does not have any cutoff portion. In the closed state shown in FIG. 3B, the valve 10 makes a slight passage between the end of the valve 10 and the inner wall of the intake pipe 3 in order to form a strong tumble flow, and does not completely block the passage of the intake pipe 3. The slight passage requires precise positioning of the valve 10 in the intake pipe 3. It is also important to precisely define the slant angle of the valve 10. If there is an error in positioning or setting of the slant angle, an unstable tumble flow may be formed.

Figure 5:
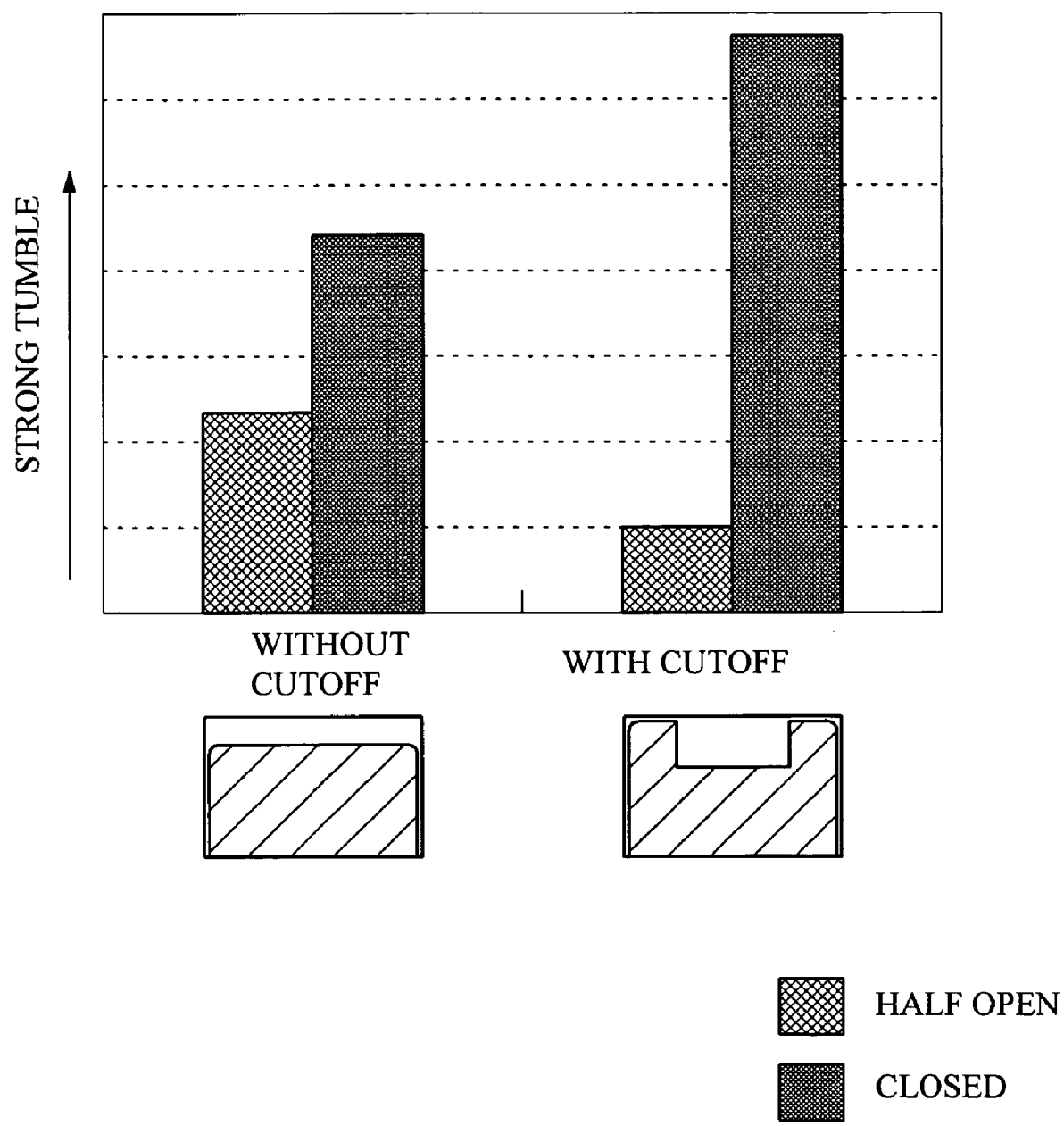
FIG. 5 shows variations in tumble flow for the valve shown in FIGS. 3A through 3C and those for the valve shown in FIGS. 4A through 4C.

In contrast, the cutoff portion 11 formed on the downstream side of the valve 10 causes the intake flow to converge into the cutoff portion 11 in the closed position shown in FIG. 4B and forms a strong tumble flow as compared to the valve 10A. The use of the cutoff portion 11 suppresses the influence of an error in positioning or the like. FIG. 5 shows tumble flows formed by the valves 10 and 10A. It is apparent from. FIG. 5 that the cutoff portion 11 of the valve 10 functions to strengthen the tumble flow in the closed state. When the valve 10 with the cutoff portion 11 is positioned in the closed state during engine idle, the A/F ratio is set leaner and the fuel economy is improved.

In the half-open state of the valve 10, a part of the intake flow is likely to be leaked to the lower passage, that is, the second intake passage 6 through the cutoff portion 11. This leakage may weaken the intake flow for producing the tumble flow in the first intake passage 5. This problem can be overcome by the intake device 1A shown in FIGS. 2A and 2B. The shape of the valve 10 shown in FIGS. 2A and 2B differ from that of the valve 10 shown in FIGS. 4A through 4C as described below.

Turning to FIGS. 2A and 2B again, the intake device 1A in accordance with the first embodiment will now be described. As shown in FIG. 2B, the valve 10 has a curved plate member. The downstream end portion 10a is formed so as to be substantially aligned with the partition plate 4 when the valve 10 is in the closed state M as shown in FIG. 2A. Therefore, the intake flow GS is formed along the downstream end portion 10a in the half-open state. It is thus possible to restrain the intake flow GS from entering into the cutoff portion 11 and leaking to the second intake passage 6 even when the valve 10 has the cutoff portion 11.

Figure 6:
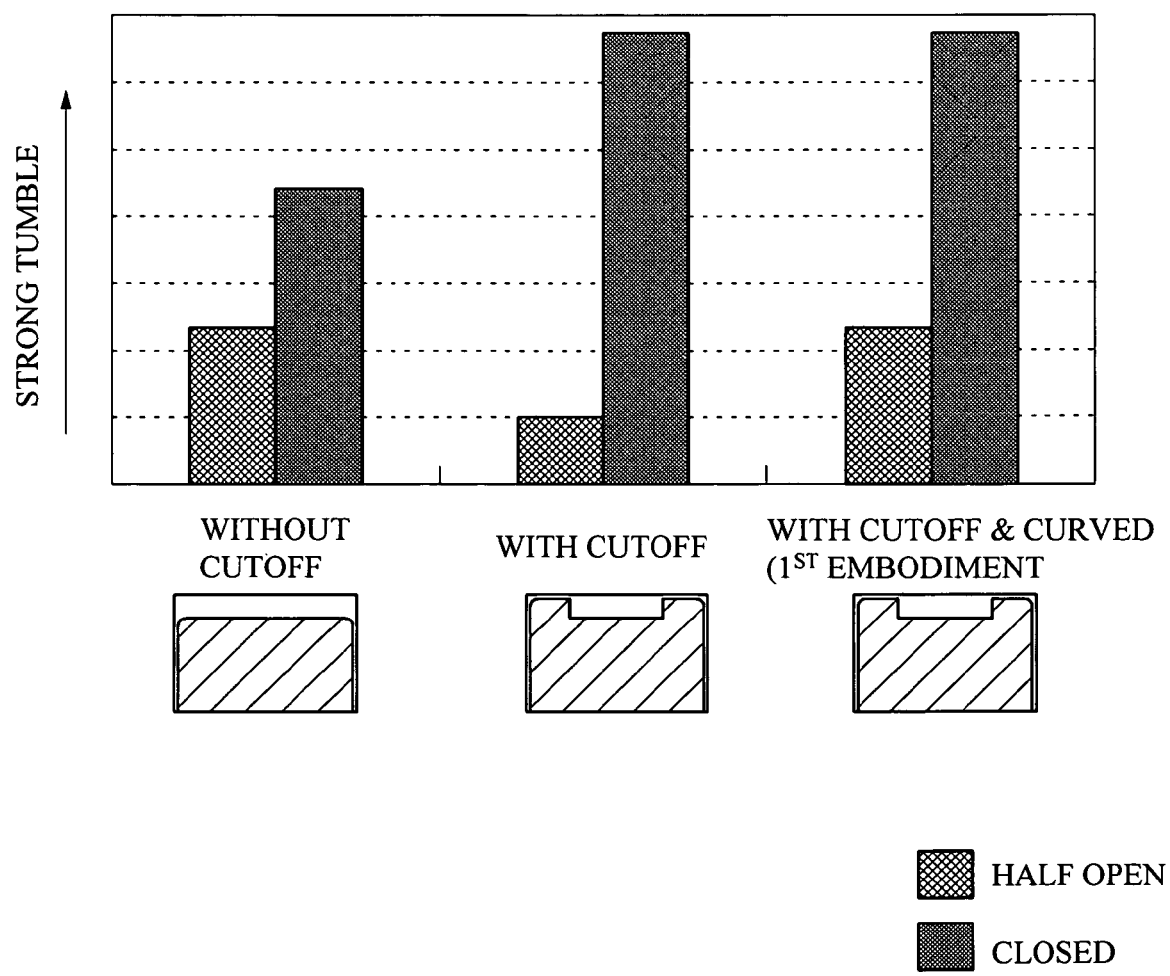
FIG. 6 shows variations in tumble flow for the valves for FIGS. 3A through 3C and 4A through 4C and those for the valve shown in FIGS. 2A and 2B.

FIG. 6 shows variations in tumble flow for the valves shown in FIGS. 2, 3 and 4. The valve 10 shown in FIGS. 2A and 2B has the cutoff portion 11 and the curved plate shape, and the valve 10A shown in FIGS. 3A through 3C has no cutoff portion. The valve 10 shown in FIGS. 4A through 4C has the cutoff portion 11 but it is not curved. It can be seen from FIG. 6 that the valve shown in FIGS. 2A and 2B forms a strong tumble flow in the closed state, and restrains the intake flow GS from leaking to the second intake passage 6 in the half-open state in which the valve 10, more specifically, the downstream end portion 10a including the cutoff portion 11 is aligned with the partition plate 4.

The intake device 1A in accordance with the first embodiment has a simple structure in which the valve 10 is rotated about the shaft 15 supported by the bearing unit 16 provided on the inner wall of the intake pipe 3. The valve 10 is moved between the fully open state P and the closed state C shown in FIG. 2A and is stopped at an arbitrary position therebetween. Thus, the tumble flow can be controlled in the wide range. When the valve 10 is in the closed state, the intake flow GS passes through the cutoff portion 11 of the valve 10, so that a strong tumble flow can be created. When the valve 10 is maintained in the closed state during engine idle, fuel economy can be improved.

In the half-open state in which the end of the valve 10 directly faces the end of the partition plate 4 on the upstream side thereof, the downstream end portion 10a including the cutoff portion 11 is aligned with the partition plate 4. Thus, the cutoff portion 11 of the valve 10 has an attitude in which it is parallel to the intake flow GS, that is, lies along the intake flow GS, so that the intake flow GS can be restrained from leaking to the second intake passage 6 and a strong tumble flow can be created even in the half-open state. The internal combustion engine equipped with the intake device 1A has improved combustion efficiency. This improves the engine torque, fuel economy and cleaning the exhaust gas.

Figure 7:
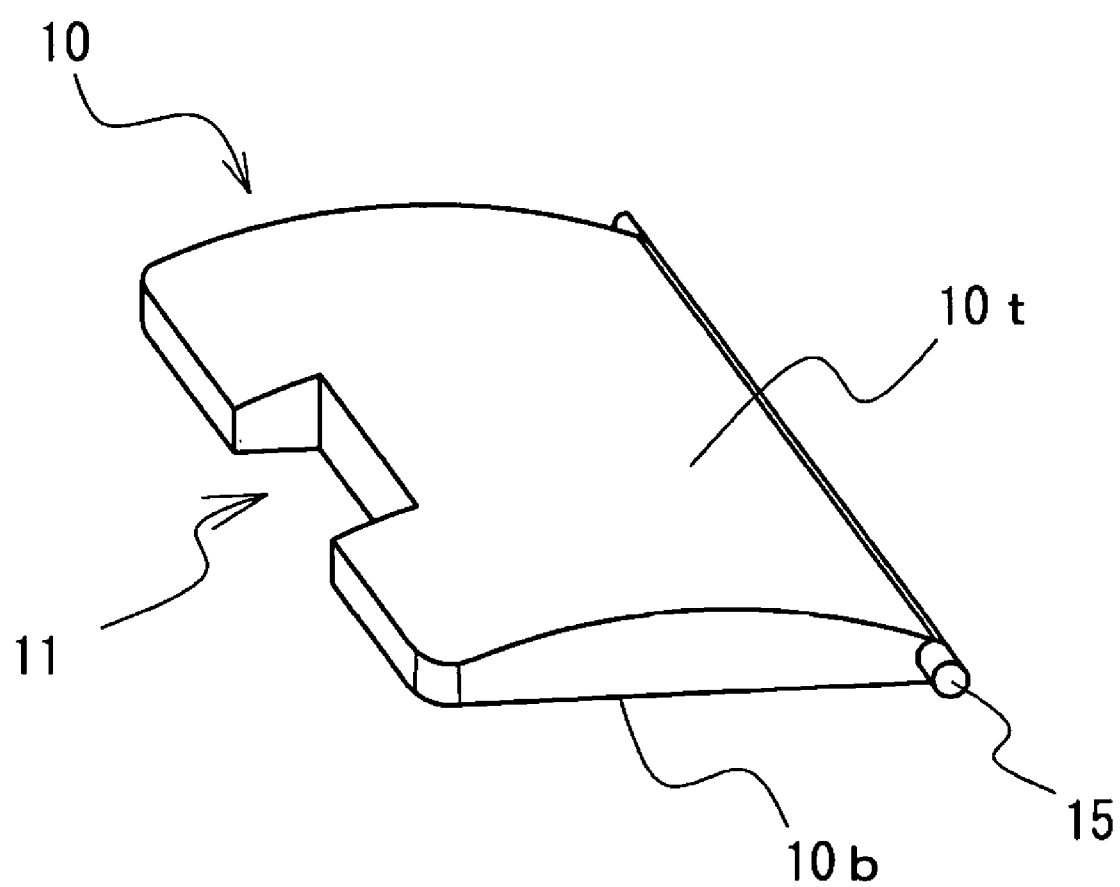
FIG. 7 is a perspective view of a variation of the valve in accordance with the first embodiment.

FIG. 7 shows a variation of the valve 10 applicable to the intake device 1A. The valve 10 shown in FIGS. 2A and 2B has the curved plate so that the intake flow GS is guided by the curved surface on the upstream side of the intake flow GS. The valve 10 is not limited to the above structure but may employ another structure as long as the valve 10 has a curved surface that enables the smooth intake flow GS and is aligned with the partition plate 4 in the half-open state. The variation of the valve 10 shown in FIG. 7 has a flat lower surface 10b and a curved upper surface 10t having a bulge like a dome shape.

(Second Embodiment)

Figure 8A:
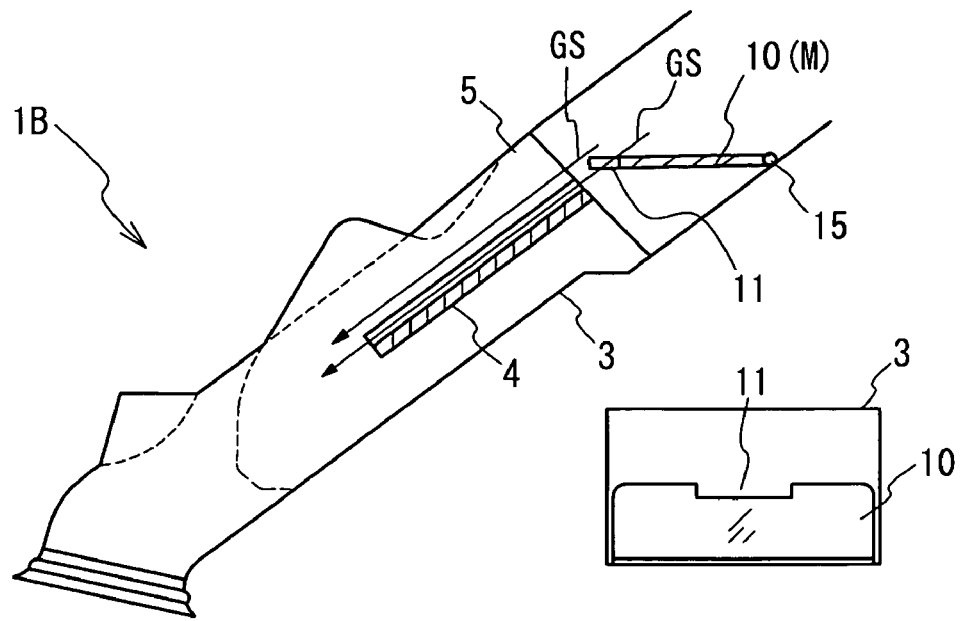
FIGS. 8A, 8B and 8C show an intake device in accordance with a second embodiment of the present invention.
Figure 8B:
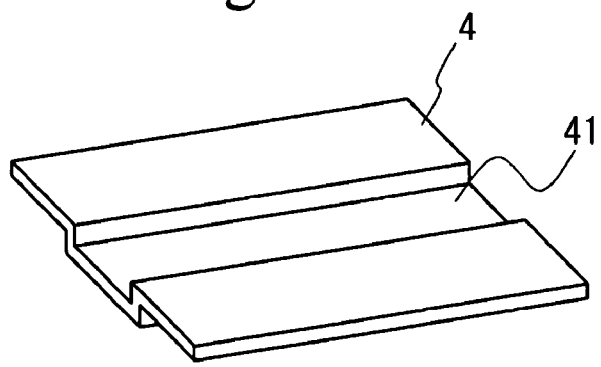
Figure 8C:
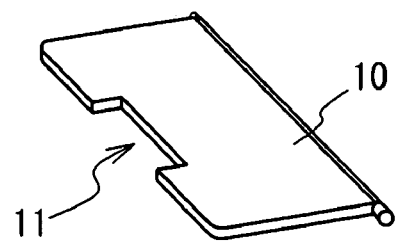

FIGS. 8A, 8B and 8C show an intake device 1B in accordance with a second embodiment of the present invention. More particularly, FIG. 8A shows a structure of the intake device 1B and also shows a figure on the right-hand side viewed from the direction of the intake flow. FIG. 8B shows the partition plate 4, and FIG. 8C shows the intake valve 10.

Referring to FIG. 8B, the partition plate 4 employed in the intake device 1B has a groove 41, which runs in the longitudinal direction and is located in the center. The groove 41 functions to receive the intake flow GS passing through the cutoff portion 11 when the valve 10 is positioned at the half-open position M. Thus, the groove 41 faces the upper intake passage 5 (first intake passage). The intake device 1B brings about advantages similar to those of the intake device 1A. The valve 10 employed in the second embodiment has a flat plate with the cutoff portion 11 on the downstream side. The valve 10 is thus simple and is producible at a reduced cost.

(Third Embodiment)

Figure 9A:
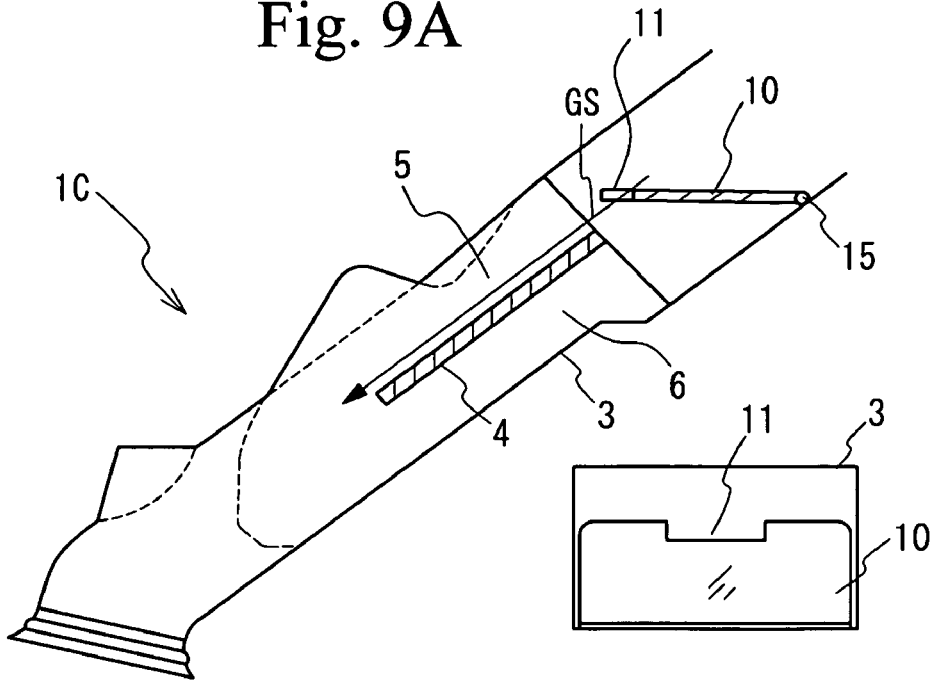
FIGS. 9A, 9B and 9C show an intake device in accordance with a third embodiment of the present invention.
Figure 9B:
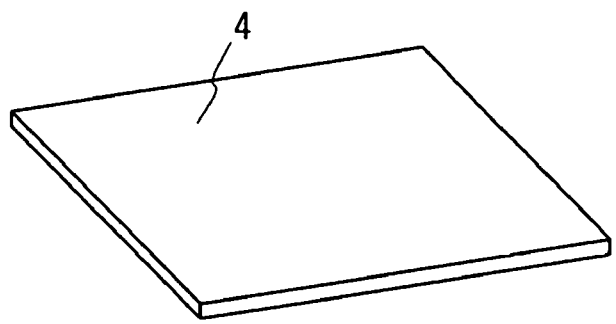
Figure 9C:
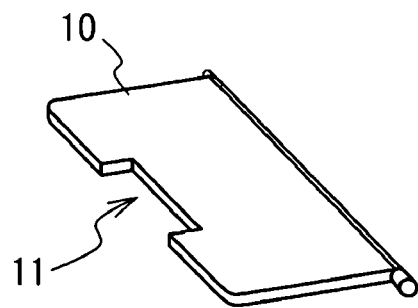

FIGS. 9A, 9B and 9C show an intake device 1C in accordance with a third embodiment of the present invention. More particularly, FIG. 9A shows a structure of the intake device 1C and also shows a figure on the right-hand side viewed from the direction of the intake flow. FIG. 9B shows the partition plate 4, and FIG. 9C shows the intake valve 10.

The partition plate 4 employed in the intake device 1C is a flat plate-shaped member, as shown in FIG. 9B. The valve 10 has the cutoff portion 11, which is located in the upper intake passage 5 (first intake passage) in the half-open state, as shown in FIG. 9A. The partition plate 4 is capable of guiding the intake flow GS passing through the cutoff portion 11 of the valve 10 to the first intake passage 5 in the half-open state M and restraining the intake flow GS from leaking to the second intake passage 6. Thus, it is possible to obtain advantages similar to those of the intake device 1A in accordance with the first embodiment. The valve 10 employed in the second embodiment has a flat plate with the cutoff portion 11 on the downstream side. The valve 10 has a length that causes the cutoff portion 11 to be located above the partition plate 4 in the half-open state. The valve 10 is thus simple and is producible at a reduced cost.

(Fourth Embodiment)

Figure 10A:
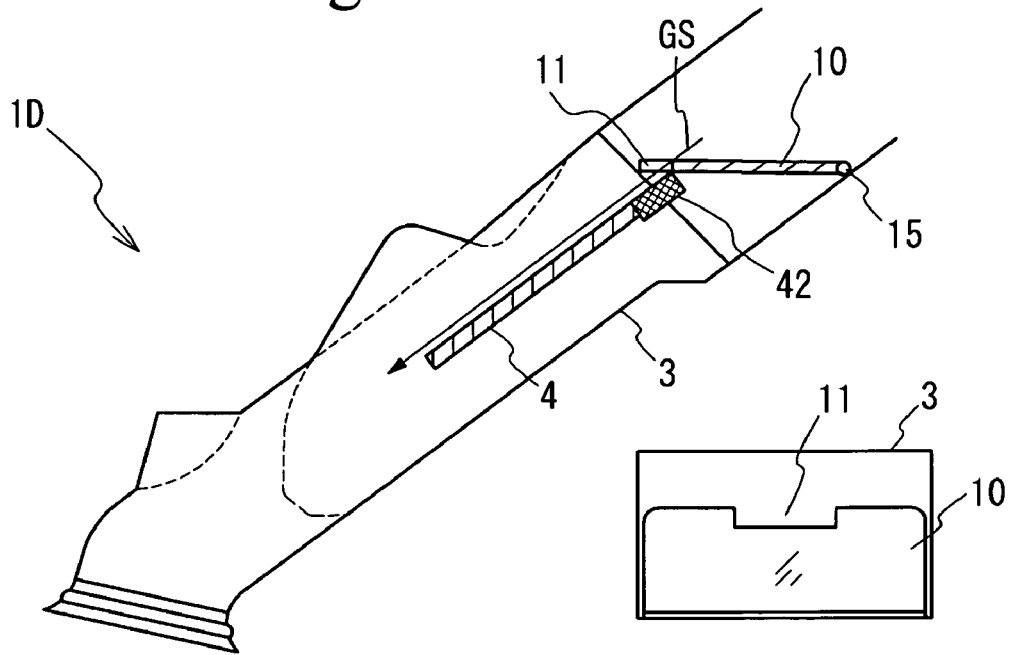
FIGS. 10A, 10B and 10C show an intake device in accordance with a fourth embodiment of the present invention.
Figure 10B:
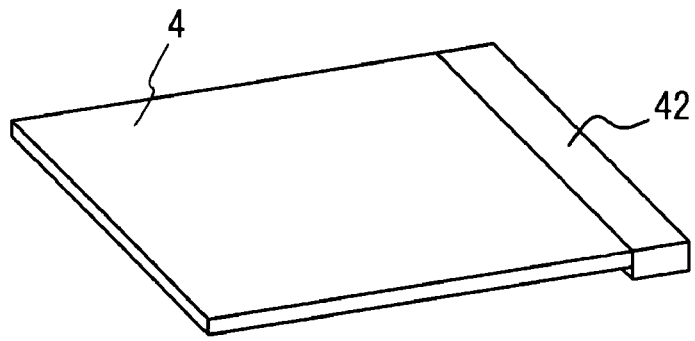
Figure 10C:
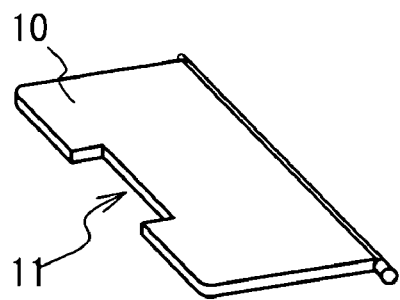

FIGS. 10A, 10B and 10C show an intake device 1D in accordance with a fourth embodiment of the present invention. More particularly, FIG. 10A shows a structure of the intake device 1D and also shows a figure on the right-hand side viewed from the direction of the intake flow. FIG. 10B shows the partition plate 4, and FIG. 10C shows the intake valve 10. As in the case of the third embodiment, the cutoff portion 11 of the valve 10 of the intake device 1D is positioned above the partition plate 4 in the half-open state M. An elastic member 42 such as rubber is attached to the end of the partition plate 4 of the intake device 1D on the upstream side, as shown in FIG. 10B. As shown in FIG. 10A, the valve 10 is brought into contact with the elastic member 42 so that the half-open state can be defined. The elastic member 42 certainly blocks the passage to the second intake passage 6, so that the intake flow GS can be prevented from leaking to the second intake passage 6 and can be guided to the first intake passage 5. Thus, the intake device 1D of the fourth embodiment has similar advantages to those of the intake device 1A of the first embodiment.

When the valve 10 rotates from the half-open state shown in FIG. 10A to the fully open state (counterclockwise), the elastic member 42 is deformed and prevented from acting as an obstacle for rotation of the valve 10. Thus, the valve 10 of the intake device 1D can be rotated between the closed state and the fully open state as values of the aforementioned embodiments.

(Fifth Embodiment)

Figure 11A:
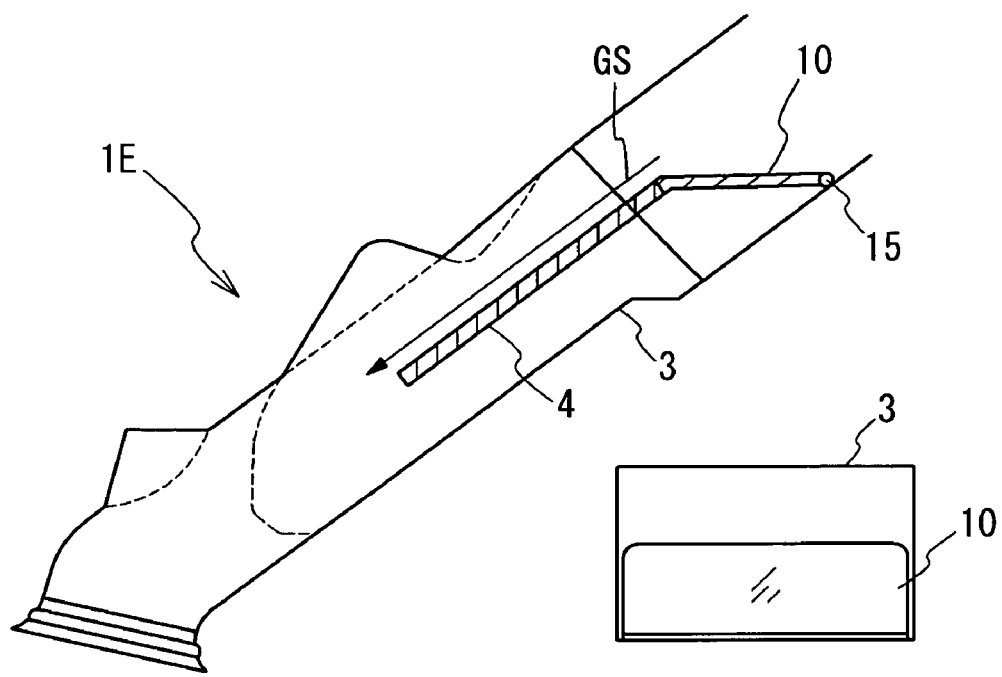
FIGS. 11A, 11B and 11C show an intake device in accordance with a fifth embodiment of the present invention.
Figure 11B:
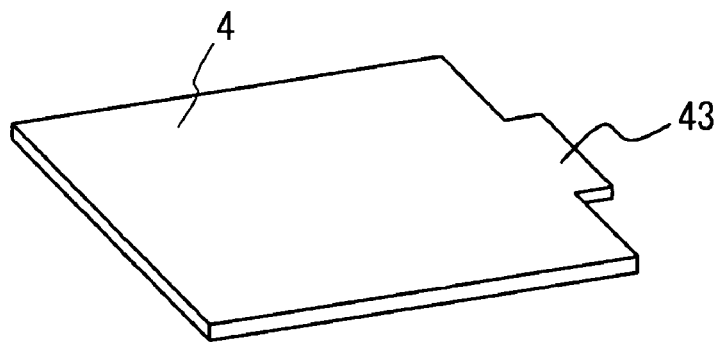
Figure 11C:
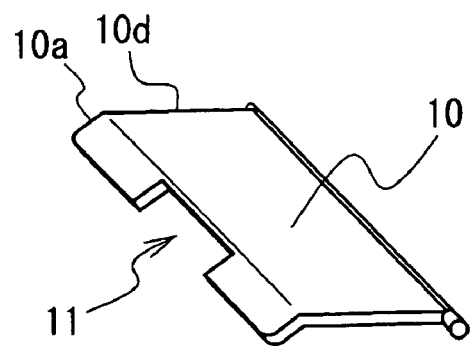

FIGS. 11A, 11B and 11C show an intake device 1E in accordance with a fifth embodiment of the present invention. The partition plate 4 employed in the fifth embodiment is equipped with a protrusion 43 at an end on the upstream side. The valve 10 of the fifth embodiment has a downstream end portion 10a, which is bent downwards from a base portion 10d. As is clearly shown in FIG. 11A, the downstream end portion of the valve 10 is aligned with the partition plate 4 in the half-open state. The downstream end portion 10a may form a flat continuous surface along with the partition plate 4 in the half-open state.

In the half-open state, the protrusion 43 of the partition plate 4 is fitted into the cutoff portion 11 of the valve 10. Thus, the intake flow GS can be prevented from leaking to the second intake passage 6 and can definitely be guided to the first intake passage 5. Thus, the intake device 1E of the fourth embodiment has similar advantages to those of the intake device 1A of the first embodiment.

The protrusion 43 is provided so as not to act as an obstacle when the valve 10 rotates from the half-open state shown in FIG. 11A to the fully open state (counterclockwise). Thus, the valve 10 of the intake device 1E can be rotated between the fully open state and the closed state like the aforementioned embodiments. The protrusion 43 may be formed integrally with the partition plate 4. Instead, an elastic member may be bonded to the end of the partition plate 4.

(Sixth Embodiment)

Figure 12A:
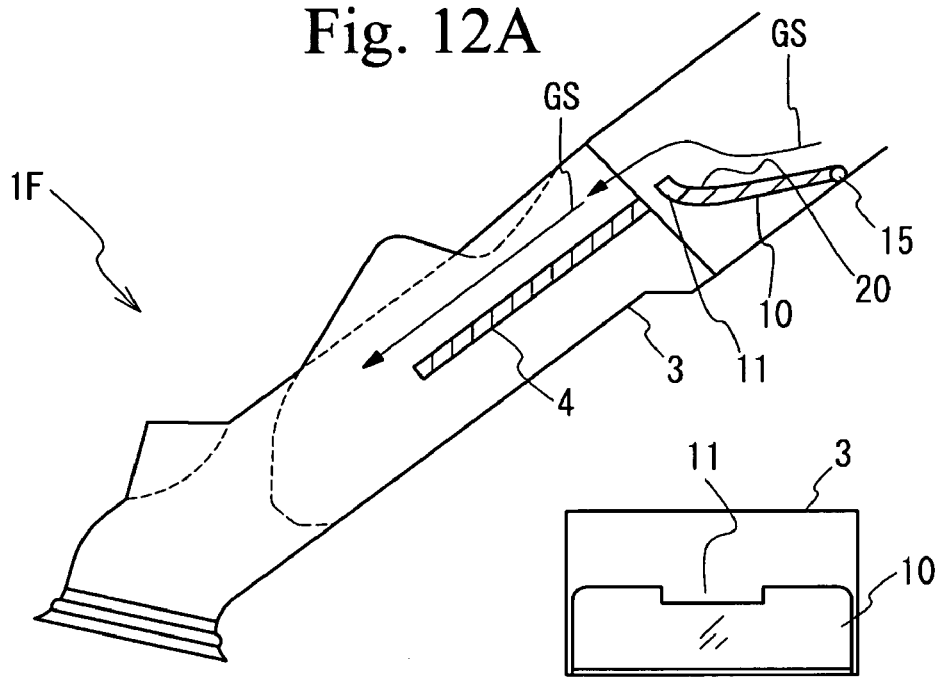
FIGS. 12A, 12B and 12C show an intake device in accordance with a sixth embodiment of the present invention.
Figure 12B:
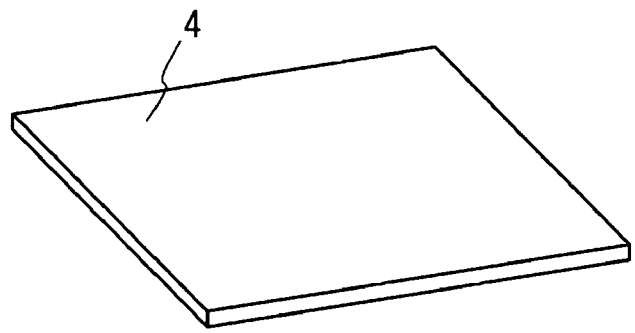
Figure 12C:
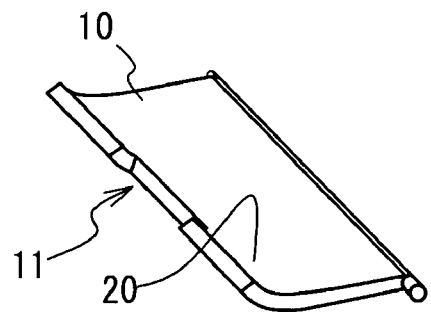

FIGS. 12A, 12B and 12C show an intake device 1F in accordance with a sixth embodiment of the present invention. The valve 10 employed in the sixth embodiment has a curved upper surface 20, which guides the intake flow GS to the end of the valve 10 on the downstream side. The end portion of the valve 10 is curved upwards from the base portion. The whole valve 10 may have a uniform thickness. In the half-open state of the valve 10 shown in FIG. 12A, the intake flow GS is guided upwardly along the curved upper surface 20, and then moves downwards along the partition plate 4. It is thus possible to prevent the intake flow GS from entering into the second intake passage 11 through the cutoff portion 11. Thus, the intake device 1F can provide advantages similar to those of the intake device 1A of the first embodiment.

(Seventh Embodiment)

Figure 13A:
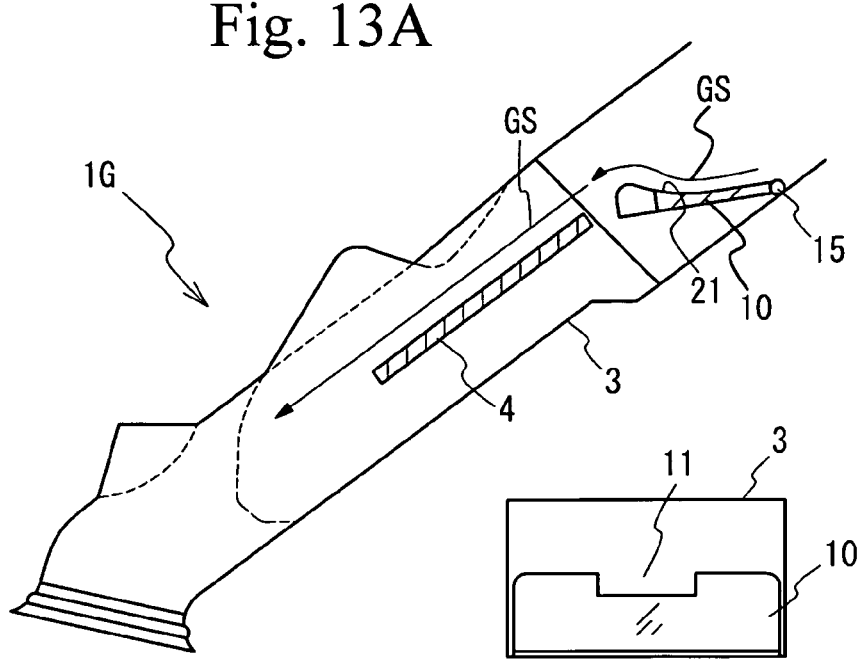
FIGS. 13A, 13B and 13C show an intake device in accordance with a seventh embodiment of the present invention.
Figure 13B:
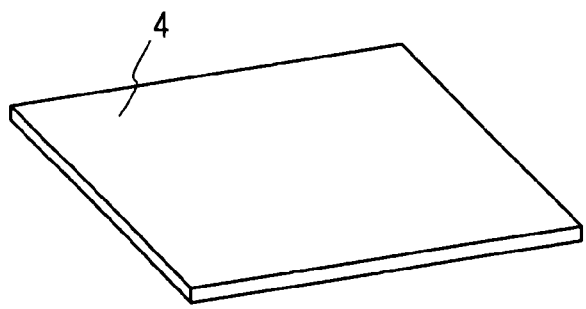
Figure 13C:
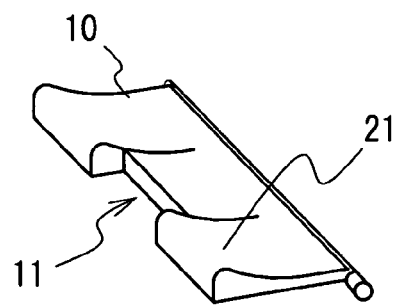

FIGS. 13A, 13B and 13C show an intake device 1G in accordance with a seventh embodiment of the present invention. The intake device 1G relates to the intake device 1F of the sixth embodiment. As described above, the valve 10 employed in the intake device 1F may be defined by shaping the plate-shaped member so as to have the curved upper surface 20. Thus, the lower surface of the valve of the sixth embodiment opposite to the curved upper surface 20 is also curved. In contrast, the valve 10 of the intake device 1G has a curved upper surface 21 only on the intake flow guiding side of the valve 10. The end portion of the valve 10 including the cutoff portion 11 has a thickness that gradually increases towards the end. The curved upper surface 21 of the valve 10 shown in FIGS. 13A through 13C guides the intake flow GS upwards in the half-open state shown in FIG. 13A so that the intake flow GS can be prevented from entering into the second intake passage 6 through the cutoff portion 11. Thus, the intake device 1G can provide advantages similar to those of the intake device 1A of the first embodiment.

(Eighth Embodiment)

Figure 14A:
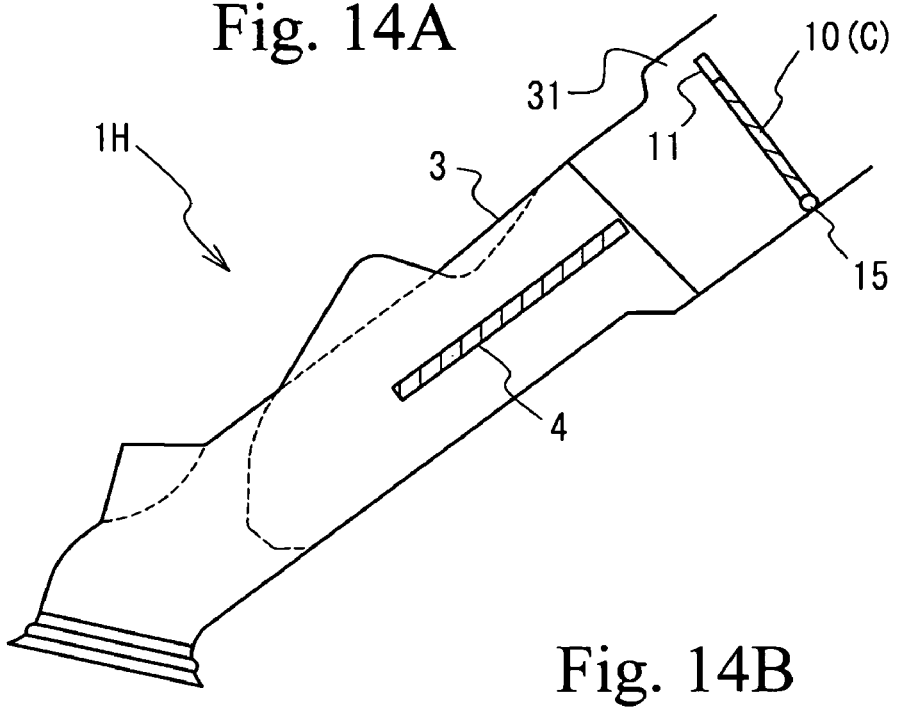
FIGS. 14A, 14B, 14C and 14D show an intake device in accordance with an eight embodiment of the present invention.
Figure 14B:
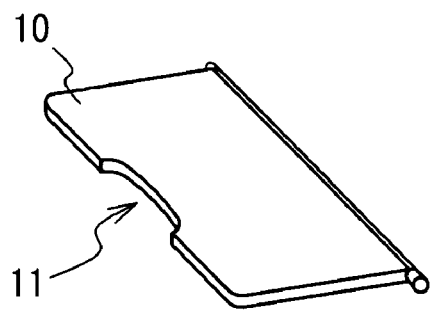
Figure 14C:
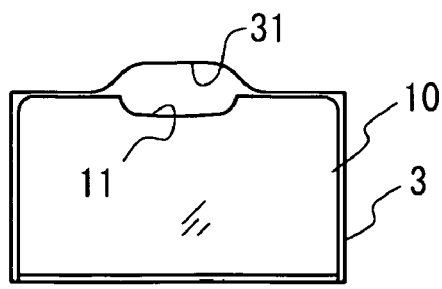
Figure 14D:
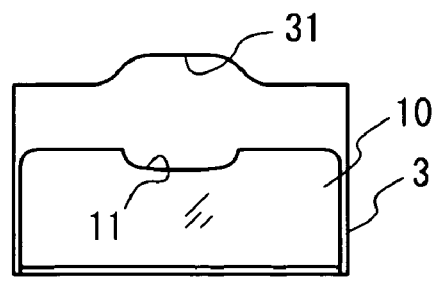

FIGS. 14A through 14D show an intake device 1H in accordance with an eighth embodiment of the present invention. This embodiment has a unique shape of the intake pipe 3, which is different from the aforementioned embodiments. The pipe 3 has a convex portion 31, which faces the downstream side of the valve 10 in the closed state, as shown in FIGS. 14A and 14C. The cutoff portion 11 of the valve 10 is smaller than that employed in each of the aforementioned embodiments. The cutoff portion 11 and the convex portion 31 define a passage for creating a strong tumble flow in the closed state. Thus, the cutoff portion 11 employed in the eighth embodiment can be made smaller than that of each of the aforementioned embodiments. It is thus possible to restrain the intake flow from leaking to the lower intake passage in the half-open state shown in FIG. 14D.

Figure 15A:
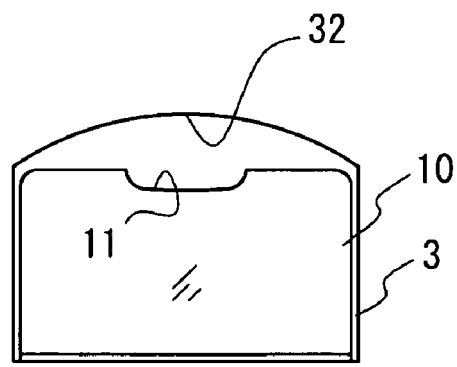
FIGS. 15A and 15B show a variation of the intake device in accordance with the eighth embodiment.
Figure 15B:
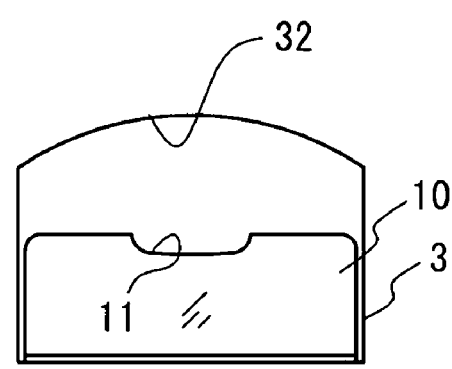

FIGS. 15A and 15B show a variation of the intake device 1H of the eighth embodiment. In FIGS. 14A through 14D, a part of the intake pipe 3 protrudes upwards from the outer surface thereof to thus define the convex portion 31. In contrast, the variation has a shape in which the whole upper portion of the intake pipe 3 protrudes upwards so that an upper inner surface is curved wholly. FIG. 15A shows the closed state of the valve 10, and FIG. 15B shows the half-open state thereof. The pipes shown in FIGS. 14A through 14D and 15A and 15B may be applied to any of the intake devices 1A through 13 in accordance with the first through seventh embodiments.

In the aforementioned embodiments, the support shaft 15 of the valve 10 is arranged on the wall surface of the second intake passage 6, that is, the lower wall portion of the intake pipe 3. However, the present invention is not limited to this structure. The support shaft 15 may be attached to the wall surface of the first intake passage 5, namely, the upper wall portion of the intake pipe 3.

(Ninth Embodiment)

FIGS. 16A, 16B and 16C show an intake device 1I in accordance with a ninth embodiment of the present invention. The intake devices 1A through 1H of the first through eighth embodiments employ the partition plates 4. In contrast, the intake device 1I does not employ the partition plate, and therefore, has a simple structure. FIG. 16A shows a state in which the valve 10 having the cutoff portion 11 partially closes the passage of the intake pipe 3. FIG. 16B shows another state in which the valve 10 closes the passage of the intake pipe 3, and FIG. 16C shows yet another state in which the valve 10 fully opens the passage.

When the valve 10 is rotated from the fully open state shown in FIG. 16C to the closed state shown in FIG. 16B, the cutoff portion 11 forms a strong tumble flow. That is, the intake device 1I is capable of adjusting the tumble flow in the wide range between the fully open state and the closed state. In the closed state shown in FIG. 16B, the strongest tumble flow that goes along the inner wall of the intake pipe 3 can be created. The intake device 1I is extremely simple and is less expensive.

As described above, the intake device 1I employed in the ninth embodiment can adjust the tumble flow in the wide range with the comparatively simple structure. The use of the cutoff portion 11 at the end portion of the valve 10 restrains error in assembly and creates the strong tumble flow in the closed state. The intake pipe 9 used in the structure shown in FIGS. 16A through 16C has a uniform diameter around the valve 10. Alternatively, the eighth embodiment shown in FIGS. 14A through 14D and the variation thereof shown in FIGS. 15A and 15B may be applied to the ninth embodiment.

The present invention is not limited to the specifically disclosed embodiments, but other embodiments, variations and modifications may be made without departing from the scope of the present invention.

The present application is based on Japanese Patent Application No. 2005-106248 filed Apr. 1, 2005, and the entire disclosure of which is hereby incorporated by reference.

What is claimed is:

1. An intake device comprising:
    an intake pipe;
    a valve having a downstream side including a cutoff portion and an upstream side rotatably attached to an inner wall of the intake pipe; and
    a partition plate provided in the intake pipe so as to divide an intake passage in the intake pipe into an upper intake passage and a lower intake passage,
    the valve having an open state in which the upper and lower intake passages are open, a closed state in which the upper and lower intake passages are closed; and an intermediate state in which the lower intake passage is closed.

2. The intake device as claimed in claim 1, wherein the valve has a downstream end portion that includes the cutoff portion and is aligned with the partition plate in the intermediate state.

3. The intake device as claimed in claim 1, wherein the valve includes a plate-shaped member having a curved upper surface that guides an intake flow to the upper intake passage in the intermediate state.

4. The intake device as claimed in claim 1, wherein the valve includes a downstream bent portion that is bent from a flat base portion and includes the cutoff portion, the downstream bent portion being aligned with the partition plate in the intermediate state.

5. The intake device as claimed in claim 1, wherein the partition plate has a protrusion that is fitted into the cutoff portion in the intermediate state.

6. The intake device as claimed in claim 1, wherein the valve includes a downstream end portion that includes the cutoff portion and guides an intake flow upwards in the intermediate state.

7. The intake device as claimed in claim 1, wherein the downstream side of the valve is thicker than the upstream side thereof so as to guide an intake flow to the upper intake passage in the intermediate state.

8. The intake device as claimed in claim 1, wherein the cutoff portion is positioned on an upper intake passage side in the intermediate state.

9. The intake device as claimed in claim 1, wherein the partition plate has a groove that receives an intake flow passing through the cutoff portion in the intermediate state.

10. The intake device as claimed in claim 1, further comprising an elastic member attached to an upstream side of the partition plate, wherein the valve contacts the elastic member in the intermediate state.

11. The intake device as claimed in claim 1, wherein the intake pipe has a convex portion that forms a passage together with the cutoff portion in the closed state.

12. The intake device as claimed in claim 1, wherein the valve has a downstream end portion that forms a continuous flat surface together with an upper surface of the valve in the intermediate state.

13. The intake device as claimed in claim 1, wherein the cutoff portion has an attitude in the intermediate state in which the cutoff portion is substantially parallel to an intake flow.

* * * * *

UNITED STATES PATENT AND TRADEMARK OFFICE
CERTIFICATE OF CORRECTION

| | | |
|---|---|---|
| PATENT NO. | : 7,156,071 B2 | Page 1 of 1 |
| APPLICATION NO. | : 11/391481 | |
| DATED | : January 2, 2007 | |
| INVENTOR(S) | : Kazuyoshi Abe et al. | |

It is certified that error appears in the above-identified patent and that said Letters Patent is hereby corrected as shown below:

Column  Line
  10         24    Change "cutoff portion" to --cutoff state--.

Signed and Sealed this

Sixth Day of November, 2007

JON W. DUDAS
*Director of the United States Patent and Trademark Office*